United States Patent [19]

Yamamoto

[11] 3,857,571

[45] Dec. 31, 1974

[54] RECORD REPRODUCING METHOD

[75] Inventor: Hiroshi Yamamoto, Tokyo, Japan

[73] Assignee: Synaps, Tokyo, Japan

[22] Filed: Nov. 2, 1972

[21] Appl. No.: 303,214

[30] Foreign Application Priority Data

Nov. 6, 1971 Japan .............................. 46-88388

[52] U.S. Cl. .................. 274/9 C, 274/39 R, 353/19
[51] Int. Cl. ......................... G11b 3/40, G11b 25/04
[58] Field of Search........ 274/40, 13 R, 9 C; 353/19

[56] References Cited

UNITED STATES PATENTS

| | | | |
|---|---|---|---|
| 2,925,753 | 2/1960 | Schwartz | 353/19 |
| 3,046,357 | 7/1962 | Fujimoto | 274/40 |
| 3,208,340 | 9/1965 | Rom | 353/19 |
| 3,210,082 | 10/1965 | Morata | 274/40 |
| 3,322,427 | 5/1967 | Fujimoto | 274/40 |
| 3,340,632 | 9/1967 | Gerry | 274/13 R |
| 3,480,356 | 11/1969 | Dimitracopoulos | 353/19 |
| 3,752,574 | 8/1973 | Kato | 353/19 |

FOREIGN PATENTS OR APPLICATIONS

| | | | |
|---|---|---|---|
| 978,124 | 12/1964 | Great Britain | 353/19 |

*Primary Examiner*—Louis R. Prince
*Assistant Examiner*—A. J. Mirabito
*Attorney, Agent, or Firm*—Wenderoth, Lind & Ponack

[57] ABSTRACT

An apparatus for reproducing recorded information from a phonograph record having visual information on an upper side thereof is disclosed. The record is placed in a stationary position and is played back or reproduced by a rotating cartridge equipped with a pickup and a stylus and mounted below said record so that the stylus may contact a record groove and travel therein, and so that mass distribution over the entire area may be maintained in equilibrium in order to prevent variations in the centrifugal force that may be applied to the tip of the stylus while the pickup is moving.

1 Claim, 6 Drawing Figures

RECORD REPRODUCING METHOD

BACKGROUND OF THE INVENTION

This invention has for its object to enable the user to simultaneously enjoy visual information reproduced sounds from a record at the same time. To attain this object the record, having visual information on its upper surface, must remain in a stationary position and the stylus is caused to travel in a groove of the record.

Most of the phonograph records which are mechanically processed are usually rotated and played back by a stationary pickup whose base end is pivoted.

There are also known phonograph sheets for an educational purpose having visual information printed on their surfaces and having sound magnetically recorded on the reverse side thereof. These sheets usually remain stationary, and are played back by a rotating head, but the head is so mounted as to provide no latitude of movement in relation to the record surface. Accordingly, the sheets cannot be played back if the relative position of the sheet and the record player is not exact. In a magnetic recording system where recordings will be so made as to allow recording errors of a comparatively greater width for the width of the head, a recording space or area will unavoidably become large, and the amount of information to be recorded in a certain record area will usually become smaller, namely a third smaller than in a mechanical recording system.

There is also a prior art system in which the reproducer stylus travels along the record groove by rotation of the cartridge instead of the head. According to this system, it is impossible to obtain a perfect sound reproduction if no other measures are taken except to rotate the cartridge and to move the stylus therewith along the record groove, because the stylus is always changing its pressure since the centrifugal force or other external forces on the cartridge are variable depending on variations in the relative position of the stylus to the record face.

According to this invention, however, perfect sound reproduction can be obtained as a result of a pickup being mounted on a turntable so as to provide uniformity over all the mass distribution area, so that the centrifugal force on the cartridge may remain unchanged when the travelling pickup changes its relative position.

Usually, a phonograph record having visual information printed on its surface must be played back so as to enable the listener to see the information as well. For this reason, the record must be fixed in position and remain stationary during the playback thereof, and also must be placed with its recorded side down so that the pickup, the cartridge and other reproducer means may not hang over and hide the information. Then, the pickup arm comprising a cartridge and a stylus is mounted on a turntable, and the stylus is pointed upwards. As the pickup arm is so mounted that uniformity may be maintained at every position that the arm takes over the mass distribution area, the cartridge has only to be brought into contact with the recorded face by a spring having a strength equivalent to the sum of the gravity or weight of the cartridge and the pressure of the stylus. By this structure, it is possible to obtain a perfect sound reproduction whether the player is placed horizontally on a desk or hung vertically on a wall, because the turntable can be mounted horizontally or vertically, or at any desired angular positions, without adversely affecting the contact of the stylus on the record groove.

BRIEF SUMMARY OF THE INVENTION

This invention relates to an apparatus for reproducing recorded information from a phonograph record having visual information printed on its upper side and a mechanically recorded groove on the reverse thereof, in which the record is fixed in a position, a turntable is horizontally and rotatably mounted, an arm disc is rotatably mounted on one side of said turntable, and a disc is mounted on the opposite side to counterbalance said arm disc, said arm disc being equipped with a cartridge at one peripheral portion thereof and having two openings on said portion to offset the weight of the cartridge.

Equilibrium of the arm disc relative to the turntable and equilibrium of the cartridge relative to the arm disc must be considered, respectively, so that these equilibriums may be maintained within the range of movement of the arm disc and cartridge.

By determining the traction of a spring in relation to the gravity or weight of the cartridge and the pressure of the stylus, it is possible to obtain a perfect sound reproduction regardless of variations in position of the cartridge relative to the record face.

BRIEF SUMMARY OF THE ACCOMPANYING DRAWINGS

DETAILED DESCRIPTION OF THE INVENTION

Figure 1:
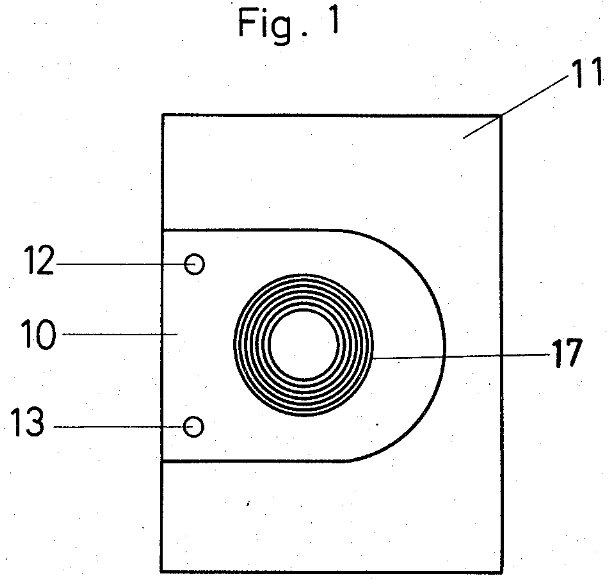
FIG. 1 shows a reverse side or recorded face of a phonograph record of a preferred embodiment of this invention; the record is attached by adhesive means to synthetic paper.
Figure 2:
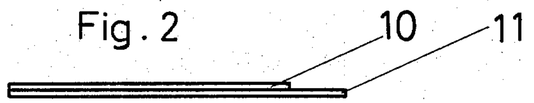
FIG. 2 is a side view of the record of FIG. 1.
Figure 3:
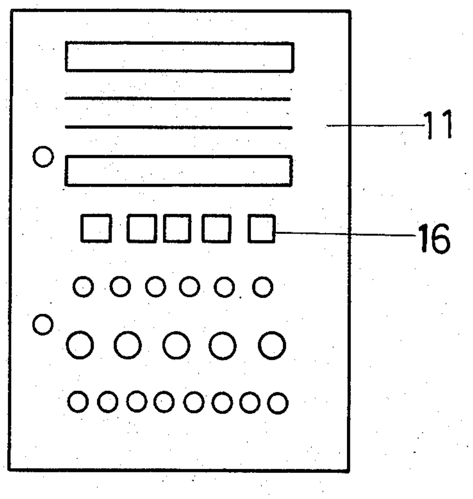
FIG. 3 shows a surface of the record of FIG. 1 having visual information printed thereon.
Figure 4:
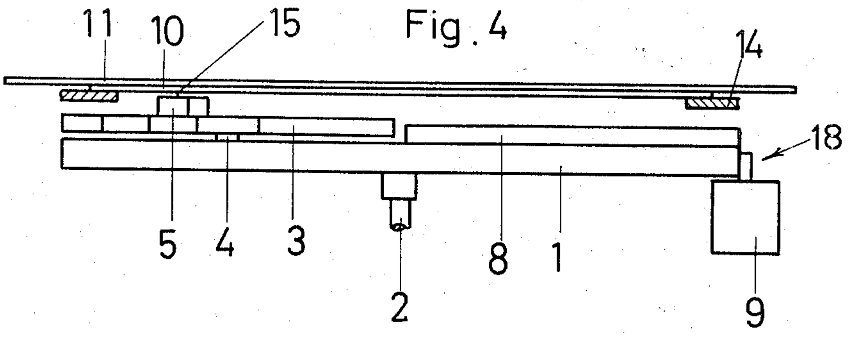
FIG. 4 is a side view of the relative position of the record and the turntable.
Figure 5:
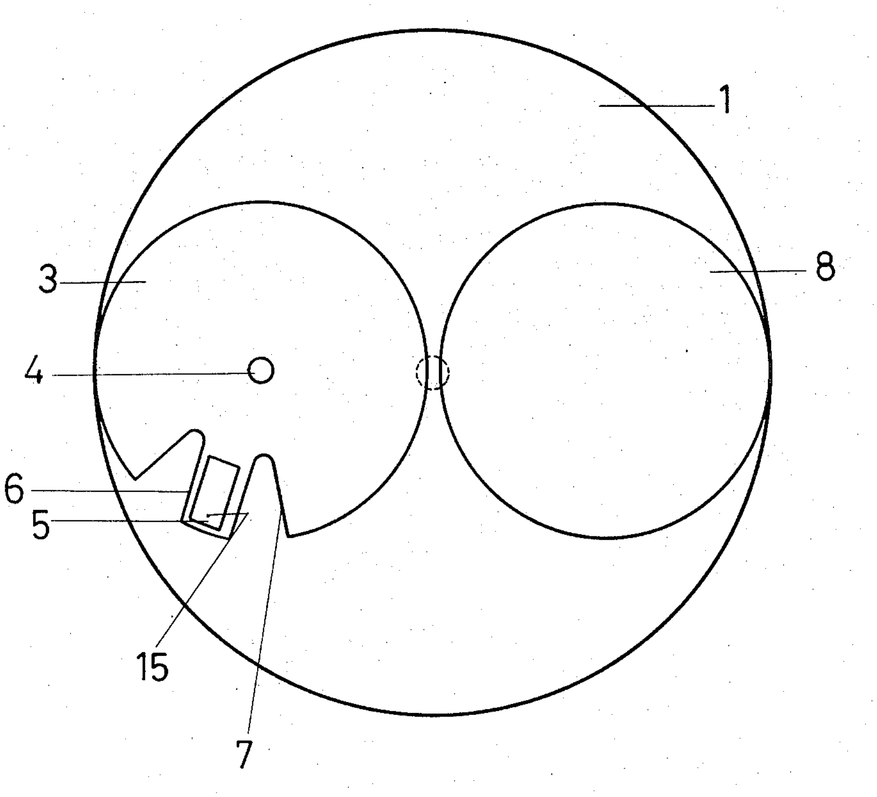
FIG. 5 is a plan view of positions where the arm disc and the cartridge are mounted on the turntable.

This invention relates to an apparatus for reproducing recorded information from a phonograph record wherein a pickup arm disc having a cartridge is mounted on a turntable rotating below the record, and a reproducer stylus the tip of which is pointed upwards is caused to resiliently contact a groove of the record.

In this case, the rotating and moving parts of the record player must be maintained in equilibrium when the relative position of the cartridge changes during the playback.

According to this invention, a pickup disc 3 having a diameter half the diameter of a turntable 1 is rotatably mounted on a spindle 4 on one side of the center spindle 2 of the turntable 1.

In mounting the pickup disc 3, it is desirable that the pickup disc 3 not extend beyond the center spindle 2 of the turntable 1, although it may extend to or beyond the periphery of the turntable 1.

A cartridge 5 is mounted on one peripheral portion of the pickup disc 3. The cartridge 5 is resiliently mounted by a spring to provide the recorded face of the record with a pressure equivalent to the sum of the stylus pressure and the weight of the cartridge 5.

The disc 3 is provided with two openings 6, 7 in the neighborhood of the cartridge 5, the two openings 6, 7 being made to offset the weight of the cartridge 5 and being of equal dimensions. The two openings 6, 7 are intended in order to maintain the disc 3 in equilibrium by offsetting the weight equivalent to that of the cartridge 5, and so openings of any shape may serve the purpose.

A disc 8 is fixedly mounted on the opposite side of the turntable 1 to counterweight the pickup disc 3.

Recording materials consist of a combination of a record proper 10 and a sturdy adhesive coated paper 11. The same information 16 are visually printed on the surface of the paper 11 as are recorded in the record proper 10.

The record is placed on portions 14 of the record player with the printed face up, and the record groove 17 faces the stylus tip 15 of the cartridge 5 located below the record.

In the accompanying drawings, the recording material is shown as made of the two elements 10, 11 mentioned above, but may only comprise the record proper 10. In this case, the record has visual information printed on the opposite face of the grooved face.

It is shown in the figure that the record proper 10 and its adhesive coated paper 11 are each about 1 m/m in thickness. However, this thickness will not be limitative, but may be varied depending on the purpose. But in determining the thickness, it must be considered that if the thickness is insufficient, it will possibly cause distortion of the recording material during the reproducing process or when not in use, and if the thickness is too great, the amount of information which can be recorded will become smaller.

In order to place the record correctly on the player, it will be desirable that reference holes 12, 13, for example, be made on the recording material, and be fitted onto projections (not shown in the figure) of the player. However, this positioning is simply one example and is not limitative. Other examples of positioning are also possible where the record adhering paper 11 will be made to fit the frame of the player or where reference grooves or lines will be provided instead of the holes 12, 13 to position the record correctly on the player. In other words, the record should be so placed that the record groove 17 is pinpointed by the stylus tip 15.

The pickup disc 3 has a uniform mass distribution over all the peripheral points thereof, so that when the cartridge 5 travels along the groove 17, the centrifugal force on every point will remain uniform, and accordingly, the contact of the stylus 15 on the groove 17 will be maintained in a constant pressure.

A better equilibrium over the entire area will be possible by designing such a pickup disc as will provide a value of the centrifugal force on the cartridge 5 in proportion to the sum of inward-directed thrust arising from the contact of the stylus 15 on the groove 17 and inward-directed thrust arising from the inertia of the disc 3 resulting from the rotation of the turntable 1.

A spindle 18 of a motor 9 contacts the peripheral side of the turntable 1. The motor 9 drives the spindle 18 to rotate the turntable 1, and then the stylus 15 travels along the groove 17 to reproduce sound recordings.

In a preferred embodiment of this invention, the turntable 1 may be about 20 cm in diameter and the pickup disc 3 may be between 4 and 9 cm in diameter.

Figure 6:
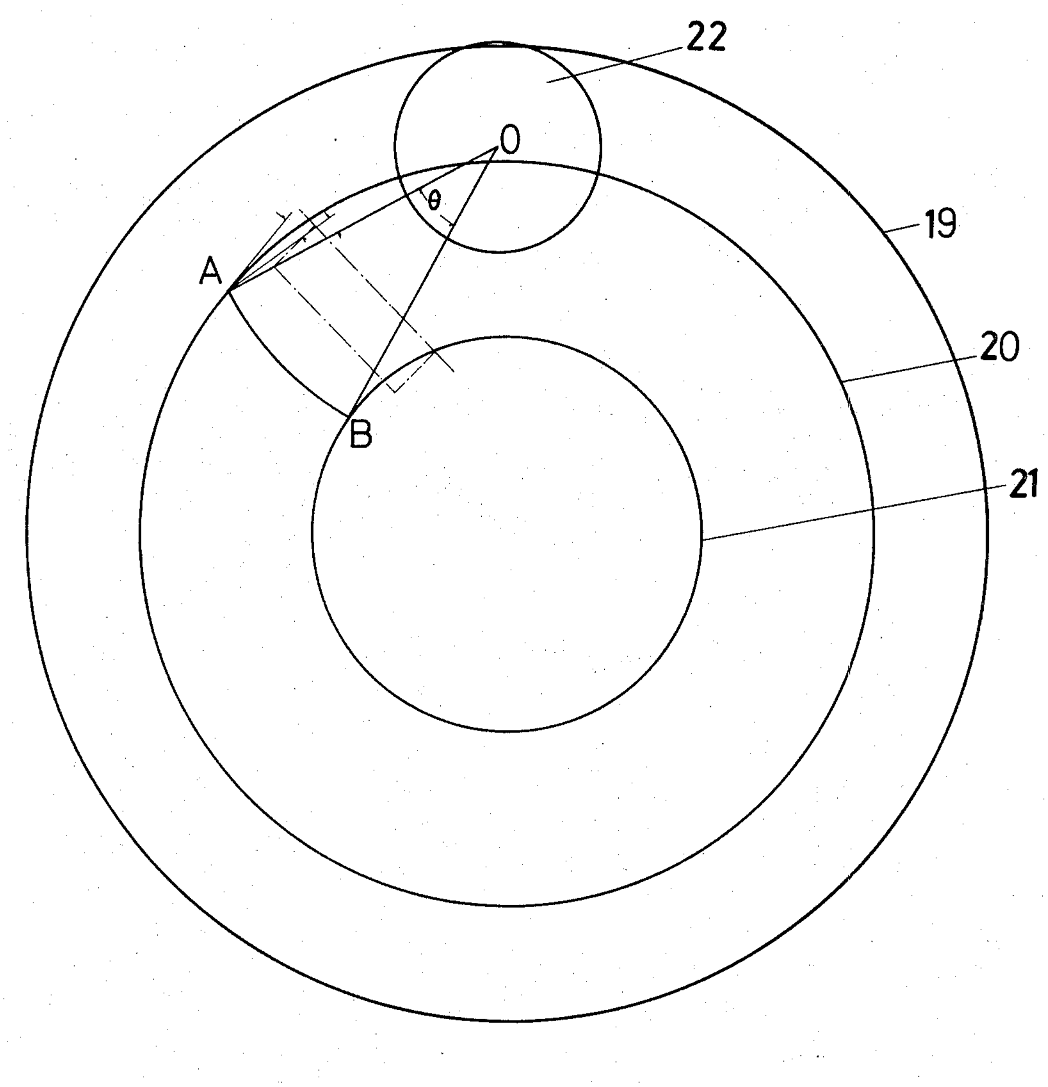
FIG. 6 is a theoretical diagram illustrating the relative position of the turntable and the arm disc.

In FIG. 6, reference numeral 19 is the periphery of the turntable 1, and 20 and 21 are the outer groove and the inner groove of the record, respectively. By connecting the center 0 of the disc 22 to points A, B by imaginary lines where the stylus contacts the outer and inner grooves, a value of the inward-directed thrust can be obtained from an angle $\theta$ that can be brought about by the two tangents A0 and B0. In other words, the smaller the angle $\theta$ is, the smaller the thrust will be, and accordingly, the center of the arm disc can be determined from this respect.

Having been thus described above, this invention provides an apparatus for reproducing recorded information from a phonograph record while enabling the listener to see information printed on the record, in which a pickup disc is rotatably mounted on one side of a turntable, a disc is fixedly mounted on the opposite side to counterbalance said pickup disc and to provide equilibrium over the entire area receiving the centrifugal force. A cartridge is mounted on the pickup disc as to provide equilibrium over the entire pickup disc, and the tip of the stylus is directed upwards to contact the lower face of the record and travel along the groove therein.

While the embodiment I have shown and described concern specific embodiments of my invention, it will be apparent that changes and modifications can be made therein without departing from the spirit of my invention or the scope of the appended claims.

I claim:

1. An apparatus for reproducing recorded information from a phonograph record having a spiral groove, comprising a turntable, a pickup disc rotatably mounted on one side of said turntable, a balancing means fixed on one side of said turntable opposite to said arm disc to maintain the turntable in equilibrium, a cartridge mounted on a peripheral portion of said pickup disc, said pickup disc having two cut out sections in the vicinity of the cartridge to offset the weight of said cartridge thereby maintaining said pickup disc in equilibrium, an upwardly pointed reproducing stylus provided on said cartridge, and a record support means positioned above said turntable whereby a phonograph record having visual information on an upper side thereof and a record groove on a lower side thereof may be placed with its upper side up and remain stationary while the reproducing stylus pointed upwardly to contact the record groove travels along the groove with rotation of the cartridge.

* * * * *